US010796353B2

(12) United States Patent
Iwaki et al.

(10) Patent No.: US 10,796,353 B2
(45) Date of Patent: Oct. 6, 2020

(54) ORDER PROCESSING DEVICE, IDENTIFICATION INFORMATION PLATE, AND ORDER PROCESSING METHOD

(71) Applicant: FUJI CORPORATION, Chiryu-shi (JP)

(72) Inventors: Noriaki Iwaki, Hekinan (JP); Shinsuke Suhara, Kariya (JP)

(73) Assignee: FUJI CORPORATION, Chiryu-shi (JP)

( * ) Notice: Subject to any disclaimer, the term of this patent is extended or adjusted under 35 U.S.C. 154(b) by 472 days.

(21) Appl. No.: 15/529,250

(22) PCT Filed: Nov. 25, 2014

(86) PCT No.: PCT/JP2014/081008
§ 371 (c)(1),
(2) Date: May 24, 2017

(87) PCT Pub. No.: WO2016/084122
PCT Pub. Date: Jun. 2, 2016

(65) Prior Publication Data
US 2017/0262916 A1  Sep. 14, 2017

(51) Int. Cl.
*G06Q 30/06* (2012.01)
*G05B 19/418* (2006.01)
*G06Q 10/08* (2012.01)

(52) U.S. Cl.
CPC ....... *G06Q 30/0621* (2013.01); *G05B 19/418* (2013.01); *G06Q 10/083* (2013.01); *G06Q 30/06* (2013.01)

(58) Field of Classification Search
CPC .................................................. Y10S 40/913
See application file for complete search history.

(56) References Cited

U.S. PATENT DOCUMENTS 4,715,636 A * 12/1987 Wiesner ............... B25J 15/0475
294/86.4
5,237,622 A *  8/1993 Howell ................. H05K 13/089
382/151

(Continued)

FOREIGN PATENT DOCUMENTS

JP       6-252111 A    9/1994
JP    2004-266164 A    9/2004
(Continued)

OTHER PUBLICATIONS

McFarlane, Duncan, et al. "Auto ID systems and intelligent manufacturing control." Engineering Applications of Artificial Intelligence 16.4 (2003): 365-376. (Year: 2003).*

(Continued)

*Primary Examiner* — Omar F Fernandez Rivas
*Assistant Examiner* — David A Hopkins
(74) *Attorney, Agent, or Firm* — Oblon, McClelland, Maier & Neustadt, L.L.P.

(57) ABSTRACT

An order processing device acquires an order request of a mounting member that is attached to mounting device and that handles a component, and component related information including information related to a component of a specific shape to be handled by the mounting member or information of a component related member that relates to a member that stores the component. Next, the order processing device outputs design data of the mounting member designed based on the acquired component related information to a customer PC of a requester. Designing of the mounting member is performed on the side of the supplier of mounting device and the design data is delivered to the requester, and the mounting member is manufactured on the requester side based on the design data using technology possessed by the requester.

7 Claims, 9 Drawing Sheets

(56) References Cited

U.S. PATENT DOCUMENTS

| | | | |
|---|---|---|---|
| 5,390,283 A * | 2/1995 | Eshelman | G06N 3/126 706/13 |
| 5,909,674 A * | 6/1999 | Schaffer | H05K 13/085 706/13 |
| 6,860,002 B2 * | 3/2005 | Oyama | H05K 13/0409 29/740 |
| 7,487,117 B1 | 2/2009 | Tamura et al. | |

FOREIGN PATENT DOCUMENTS

| | | |
|---|---|---|
| JP | 2014-27064 A | 2/2014 |
| JP | 2014-45074 A | 3/2014 |
| JP | 2014-130960 A | 7/2014 |
| WO | WO 00/25243 A1 | 5/2000 |
| WO | WO 2014/049766 A1 | 4/2014 |

OTHER PUBLICATIONS

Brian Dorey, "DIY Pick and Place V2 Project Complete", Nov. 23, 2013, https://www.briandorey.com/post/diy-pick-and-place-v2-project-complete (Year: 2013).*

Wikipedia, Nameplate, Accessed via Wayback Machine, https://en.wikipedia.org/wiki/Nameplate (Year: 2014).*

Pham, D. T., and S. H. Yeo. "Strategies for gripper design and selection in robotic assembly." The International Journal of Production Research 29.2 (1991): 303-316. (Year: 1991).*

Nanda, Ardhen Du Prasad. Design & Development of a Two jaw parallel Pneumatic Gripper for Robotic Manipulation. Diss. National institute of Technology Rourkela, 2010. (Year: 2010).*

International Search Report dated Mar. 3, 2015 in PCT/JP2014/081008 filed Nov. 25, 2014.

* cited by examiner

ORDER PROCESSING DEVICE, IDENTIFICATION INFORMATION PLATE, AND ORDER PROCESSING METHOD

TECHNICAL FIELD

The present application relates to an order processing device, an identification information plate, and an order processing method, in detail, to an order processing device, an identification information plate, and an order processing method related to mounting processing of mounting components on a board.

BACKGROUND ART

Conventionally, in a mounting system, a management device has been proposed (for example, refer to patent literature 1) that, in a case in which the management device determines that there is no track record for loading a target insertion type electronic component to a mounting device based on a component database, determines whether there is an insertion type electronic component similar to the target insertion type electronic component based on type information of the component database, and if there is a loading track record for the similar insertion type electronic component, determines that the target insertion type electronic component can be loaded. With this management device, information indicating that loading is possible is output to a terminal via a communication section, and the target insertion type electronic component is memorized in a memory section as a provisional component with a provisional loading track record.

CITATION LIST

Patent Literature

Patent literature 1 JP-A-2014-27064

SUMMARY

Problem to be Solved

However, generally, with a mounting device, there are cases in which a custom mounting member (for example, a gripping claw used as a holding member or the like) is required in accordance with the shape of the component or the board used for mounting. Normally, a supplier of mounting devices manufactures a dedicated mounting member in accordance with the size and shape of the component to be mounted, and delivers the dedicated mounting member to a user. However, there are cases in which it is difficult for a supplier of mounting devices to manufacture a mounting member, for example in a short time, for each type of a diverse range of electronic components. On the other hand, there are cases in which a user possesses the technology to manufacture a mounting member.

The present disclosure takes account of such problems and a main object thereof is to provide an order processing device, identification information plate, and order processing method that provides a mounting member for mounting processing with a more appropriate division of labor.

Means for Solving the Problem

The present disclosure uses the following means to achieve the above object.

That is, the present disclosure is an order processing device that handles information relating to a mounting related processing device that performs processing related to mounting of mounting components on a board, the order processing device including: an information acquiring section configured to acquire, either together or individually, via a network from an information processing device of a requester, an order request of a mounting member that is related to handling of a component with a specific shape and that is attached to the mounting related processing device, and component related information that includes at least one of information related to the component with the specific shape and information related to a component related member on which the component with the specific shape is stored or loaded; and an information outputting section configured to output to an information processing device of the requester via a network design data of the mounting member designed based on the acquired component related information.

Effects

With this device, an order request of a mounting member that is attached to a mounting related processing device, and component related information that includes information related to a component with a specific shape to be handled by the mounting member or information of a component related member related to the component, are acquired either together or individually, and design data of the mounting member designed based on the acquired component related information is output to an information processing device of the requester. That is, designing of the mounting member is performed on the side of the supplier of the component related processing device and the design data is delivered to the requester, and the mounting member is manufactured on the requester side based on the design data using technology possessed by the requester. Accordingly, it is possible to provide a mounting member related to mounting processing with a more suitable division of labor.

Here, a mounting related processing device may be, in addition to a mounting device that mounts components on a board, for example, as required for mounting processing, a printing device that applies a specified application material (for example, solder paste or adhesive) onto a board, a hardening processing device (reflow oven) that hardens the application material applied on the board, an inspection device that inspects the state of the board or the component, or a board conveyance device that performs conveyance processing on the board. Also, for "processing related to mounting processing," for example, in addition to mounting processing of mounting components on a board, printing processing of applying a specified application material to a board, hardening processing of hardening the application material applied to the board, inspecting processing of inspecting the state of the board or the components, conveyance processing of conveying the board, and the like, can be considered. Also, the mounting member may be at least one of a gripping member configured to grip a component, a suction nozzle configured to pick up a component using suction, or an adapter attached with a storing member configured to store a component.

DESCRIPTION OF EMBODIMENTS

Figure 1:
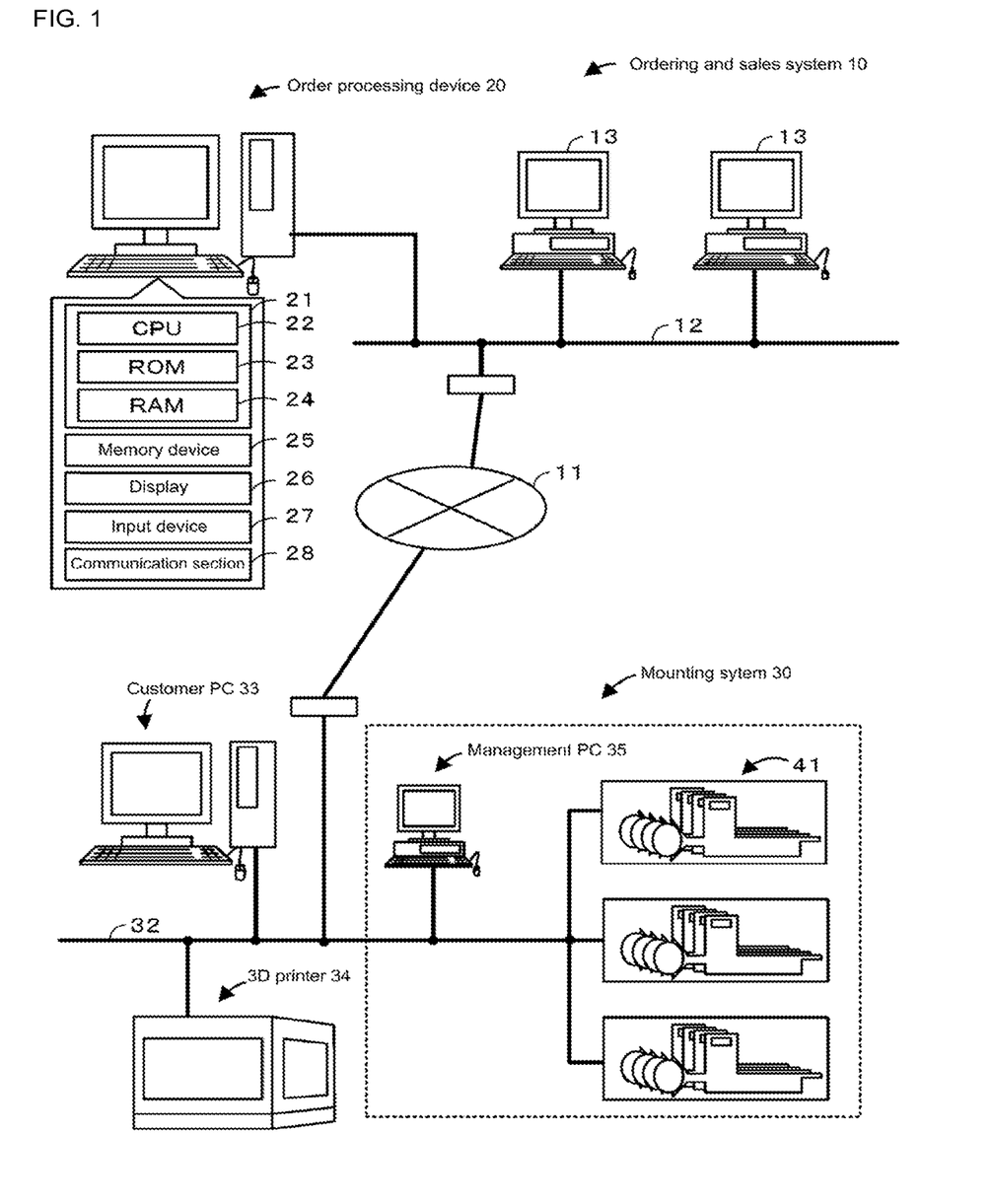
FIG. 1 is a schematic view of ordering and sales system 10 and mounting system 30.
Figure 2:
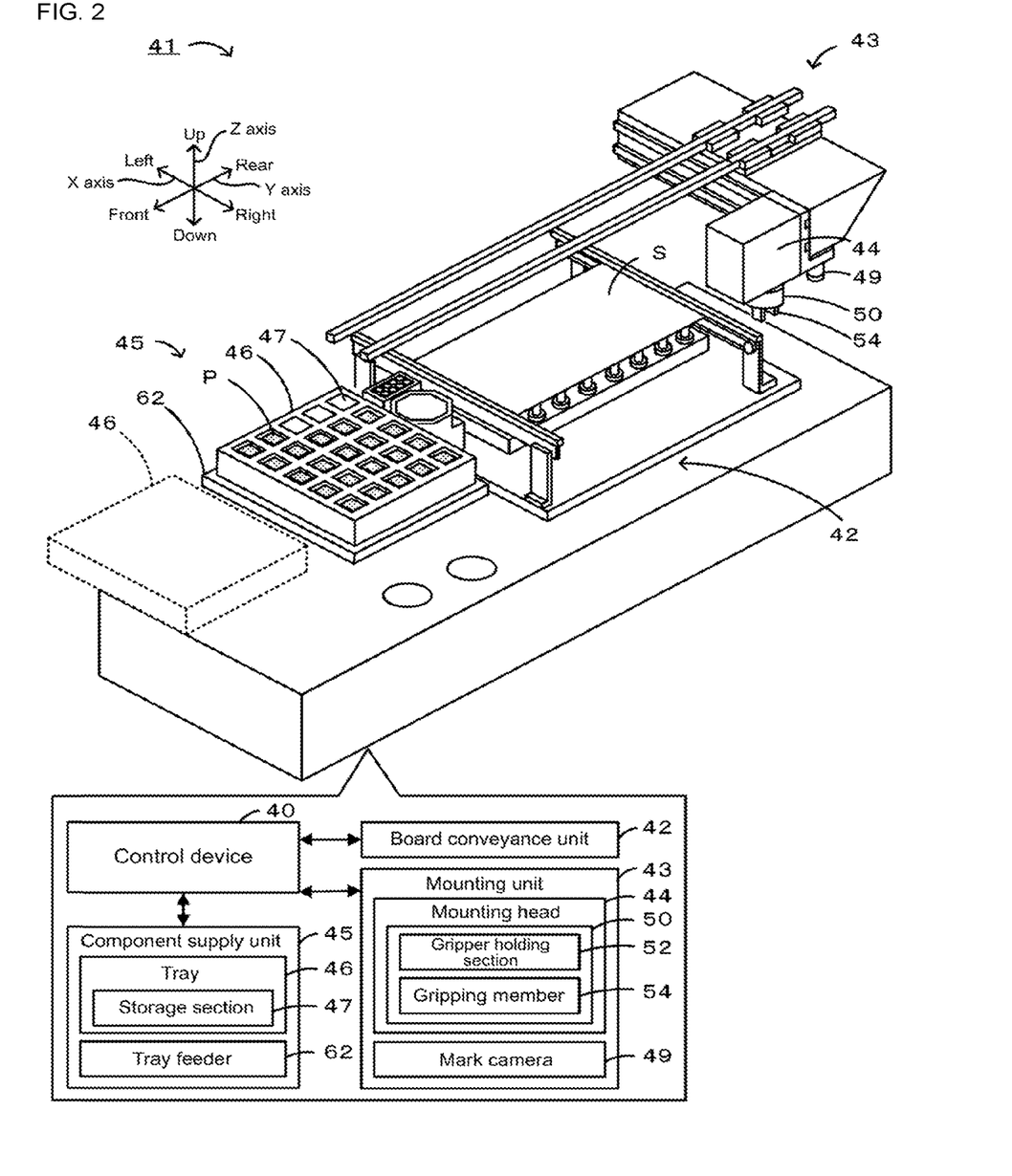
FIG. 2 shows an outline of the configuration of mounting device 41.
Figure 3:
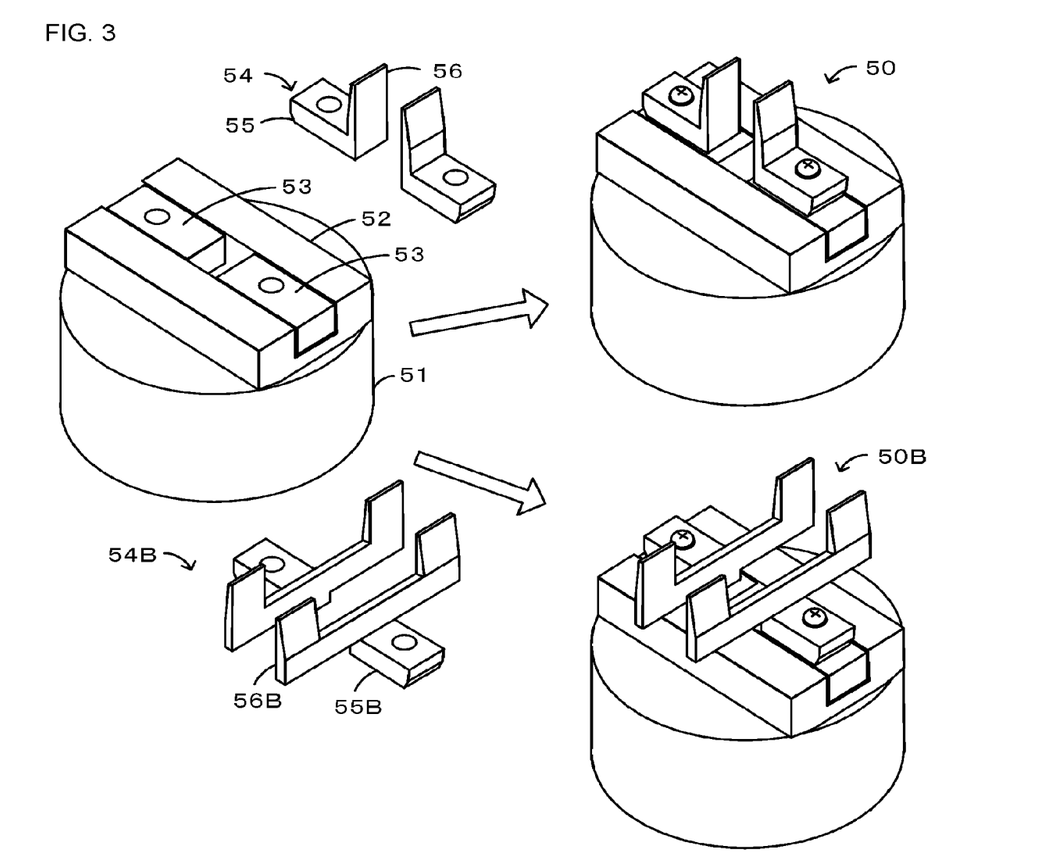
FIG. 3 shows an outline of the configuration of mechanical chucks 50 and 50B.
Figure 4:
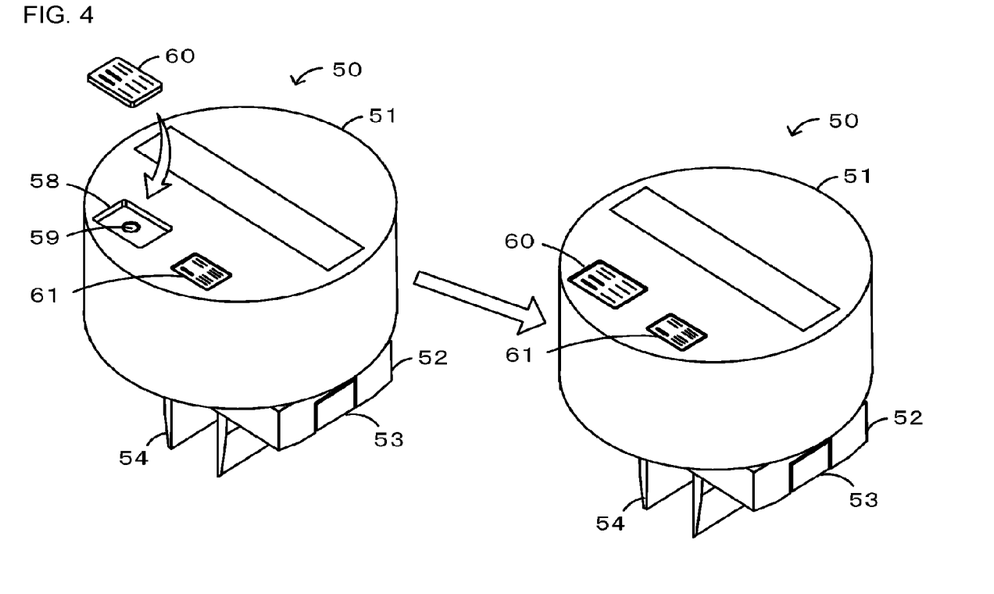
FIG. 4 illustrates attaching of gripping member identification information plate 60.
Figure 5:
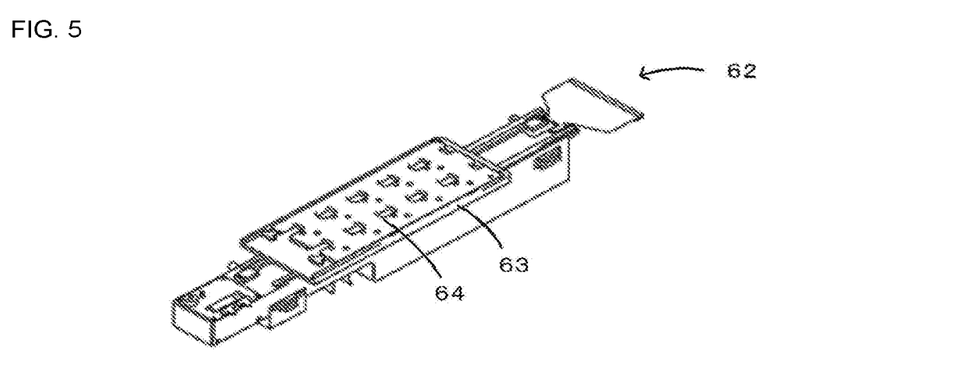
FIG. 5 illustrates tray feeder 62 and adapter 64.
Figure 6:
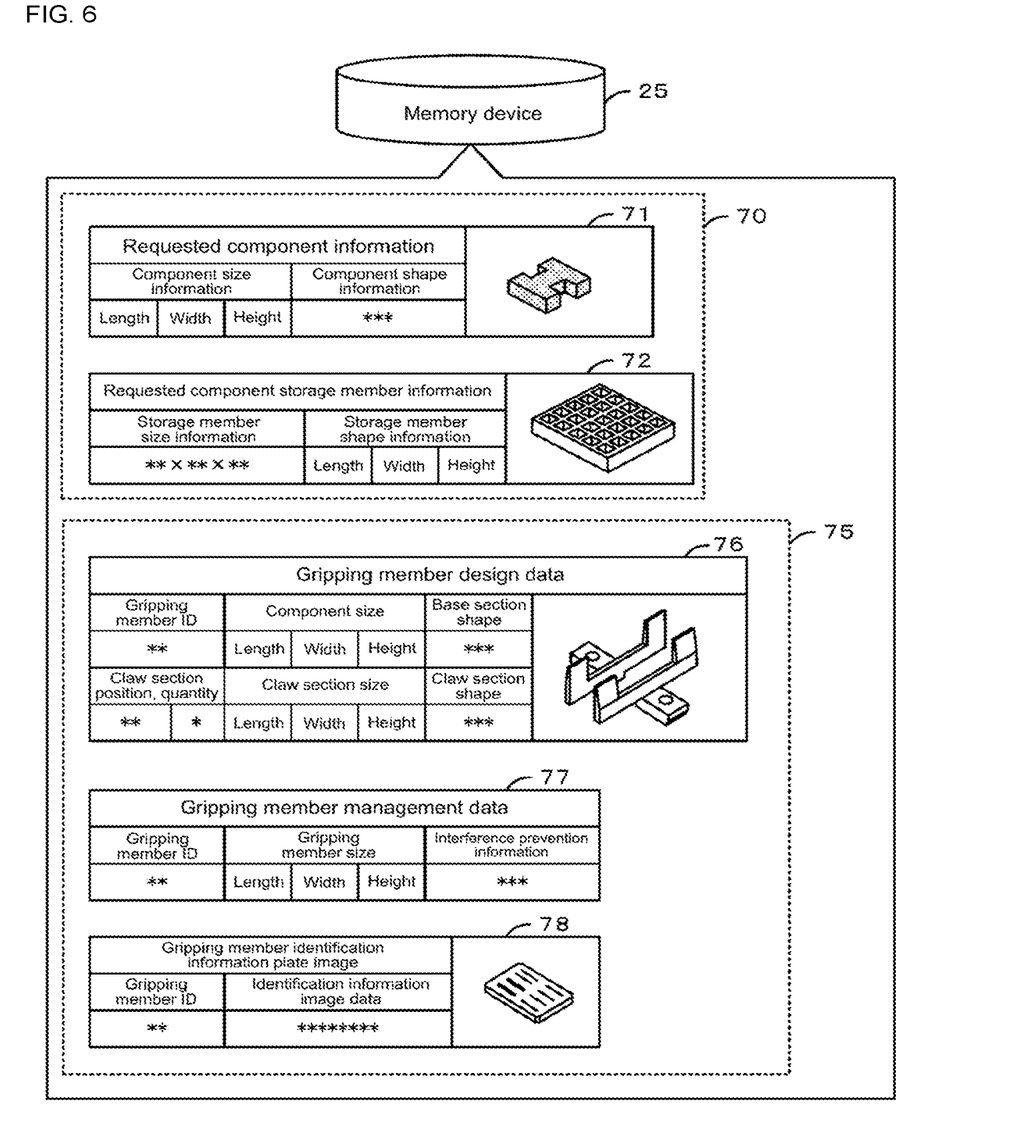
FIG. 6 illustrates information memorized on memory device 25.

Hereinafter, an embodiment of the present disclosure will be described with reference to the figures. FIG. 1 is a schematic view of ordering and sales system 10 provided with order processing device 20, and of mounting system 30 provided with a mounting related processing device. FIG. 2 shows an outline of the configuration of mounting device 41. FIG. 3 shows an outline of the configuration of mechanical chucks 50 and 50B. FIG. 4 illustrates attaching of holding member identification information plate 60 to mechanical chuck 50. FIG. 5 illustrates tray feeder 62 and adapter 64. FIG. 6 illustrates component related information 70 and delivery data 75 memorized on memory device 25. In the present embodiment, left-right directions (X axis), front-rear directions (Y axis), and up-down directions (Z axis) are set as shown in FIG. 2. Mounting processing includes processing such as arranging a component above a board, mounting, insertion, joining, and gluing. Also, a mounting related processing device includes, in addition to mounting device 41 that mounts components on a board, a printing device that applies a specified application material (for example, solder paste or adhesive) onto a board, a hardening processing device (reflow oven) that hardens the application material applied on the board, an inspection device that inspects the state of the board or the component, a board conveyance device that performs conveyance processing on the board, and the like. In the present embodiment, for convenience of description, the mounting member of the present disclosure is mainly described as gripping member 54 (refer to FIG. 3).

As shown in FIG. 1, ordering and sales system 10 that is on the supplier side is provided with multiple design computers (PCs) connected to LAN 12, and order processing device 20 connected to LAN 12. Design PC 13 is a computer used for performing design and so on of devices included in mounting system 30 and mounting members attached to mounting device 41. Order processing device 20 is configured from a server that handles information related to a mounting related processing device that performs processing related to mounting processing of mounting components P (refer to FIG. 2) on board S. Order processing device 20, for example, is used to perform receipt of an order of a mounting device 41, and receipt of an order and delivery of a mounting member to be attached to mounting device 41. Order processing device 20 sends data to customer PC 33 (information processing device), and receives information from customer PC 33 via network 11, such as the internet. Order processing device 20 is provided with control section 21 for performing overall device control, memory device 25 for memorizing various types of application programs and various types of data files, display 26 that displays various pieces of information, input device 27 such as a keyboard or mouse via which an operator enters various commands, and communication section 28 that performs communication with external devices such as design PC 13. Control section 21 is configured from a microprocessor based around CPU 22, and is provided with ROM 23 on which various processing programs and the like are memorized, and RAM 24 used for temporarily memorizing data.

In the system on the customer side, mounting system 30, customer PC 33, and 3D printer 34 are each connected to LAN 32. Customer PC 33 is configured as an information processing device, and is provided with a control section including a CPU or the like, a display, an input device, and a communication section. Customer PC 33 is used to perform data exchange with management computer 35 or the like of mounting system 30, and data exchange with order processing device 20 via network 11. 3D printer 34 is for forming a solid body using, for example, resin, based on design data. Mounting system 30 is configured as a production line that mounts components P on board S (refer to FIG. 2), and is provided with multiple mounting devices 41, a printing device, an inspection device, a reflow oven, and the like, which are not shown. Also, mounting system 30 is provided with management computer 35 that manages information used by mounting device 41 and the like.

As shown in FIG. 2, mounting device 41 is provided with control device 40, board conveyance unit 42, mounting unit 43, and component supply unit 45. Control device 40 is configured from a microprocessor that is based around CPU 41, and performs overall device control. Control device 40 is connected such that two-way communication is possible to board conveyance unit 42, mounting unit 43, component supply unit 45, and the like, and exchanges signals with these units and the like. Control device 40 memorizes member management information related to mounting members to be attached to mounting device 41, and performs mounting processing while understanding which mounting member is attached by using the member management information.

Board conveyance unit 42 is provided with conveyor belts and conveys board S loaded on the conveyor belts from left to right. Mounting unit 43 is for picking up components P and arranging them on board S, and is provided with mounting head 44 capable of moving in the XY directions, and mechanical chuck 50 that is attached to mounting head 44 and that holds component P using gripping member 54. Mounting head 44 moves in the XY directions by the driving of a moving motor, with a slider being guided by a guide rail that is a guiding member. Mark camera 49 that reads various marks below mounting head 44 is provided on mounting head 44. Also, mechanism chuck 50 is moved in the Z-axis direction by a vertical mechanism that is not shown.

Mechanical chuck 50 is described below. As shown in FIGS. 3 and 4, mechanical chuck 50 is provided with fixing section 51, gripper holding section 52, sliders 53, and gripping member 54. Fixing section 51 is formed as a cylinder, and is a connection member connected to mounting head 44; gripper holding section 52 is fixed to the bottom surface of fixing section 51 (FIG. 4). Also, as shown in FIG. 4, provided on the upper surface of fixing section 51 are fixing section identification information display section 61 on which is a code of identification information of fixing section 51, plate attaching section 58 that is a recess in which gripping member identification information plate 60 is attached, magnet 59 provided in the center of plate attaching section 58, and so on. As shown in FIG. 3, gripper holding section 52 is a cuboid with a large groove formed in the lengthwise direction, and sliders 53 are slidably provided at one end and the other end of the groove. Slider 53 is a member for fixing gripping member 54 in a slidable manner. Slider 53, when fixing section 51 is connected to mounting head 44, is connected to a drive section on the mounting head 44 side by a drive mechanism, which is not shown, and performs gripping operation of gripping member 54 along the groove of gripper holding section 52 via the drive section.

Gripping member 54 is an exchangeable mounting member that grips component P. Gripping member 54 includes base section 55 that fixes to slider 53, and claw section 56 that grips component P by contacting the outer surface of component P, claw section 56 being formed in accordance with the shape of component P and protruding form base section 55. This gripping member includes many shapes in accordance with the types and shapes of components P, for example, gripping member 54 with a pair of base sections 55 formed with one claw section 56, gripping member 54B with a pair of base sections 55B formed with two claw sections 56B, and so on. Also, gripping members include items that have a pair of base sections with one claw section each and a pair of base sections with two claw sections each. Mechanical chuck 50 is an item with gripping member 54 fixed to sliders 53; mechanical chuck 50B is an item with gripping member 54B fixed to sliders 53. As shown in FIG. 4, prepared for gripping member 54 is gripping member identification information plate 60, on the surface of which identification information for that gripping member 54 is formed. Gripping member identification information plate 60 is a stainless steel plate. An operator, when exchanging a gripping member, removes the plate on plate attaching section 58, and attaches a gripping member identification information plate 60 that corresponds to the newly attached gripping member to plate attaching section 58. Mounting device 41 is able to recognize the gripping member 54 currently attached by reading gripping member identification information plate 60 with mark camera 49.

As shown in FIG. 2, component supply unit 45 is provided with tray 46 (storage member) in which multiple components P are stored, and tray feeder 62 that moves tray 46 between a specified initial position and a pickup position. Multiple trays 46 are set in a magazine cassette, which is not shown, provided at the front side of mounting device 41, and when components P run out, exchange of trays is performed by tray feeder 62. Tray 46 is formed from resin with an outer shape that is rectangular and flat, and multiple storage sections 47 that store components P are formed in tray 46. Storage sections 47 are many cavities arranged front to rear and left to right in a grid. Storage sections 47 are formed in tray 46 according to the outer shape of component P to be stored. As shown in FIG. 5, tray feeder 62 is provided with tray shuttle 63 that moves between a specified initial position and a pickup position, and adapter 64 loaded on tray shuttle 63 as an attachment member. Adapter 64 is a plate-like member on which tray 46 is arranged, adapter 64 being formed with a shape in accordance with tray 46 that stores components P. When tray 46 has been pulled forward from the magazine cassette and arranged at the specified pickup position by tray feeder 62, components P stored in tray 46 can be picked up by mounting head 44.

Now that the configuration of mounting device 41 has been described, descriptions will be given regarding information memorized on memory device 25 of order processing device 20 that is on the supplier side. Memory device 25, for example, as shown in FIG. 6, memorizes component related information 70 that is information acquired from a customer, and delivery data 75 that is information delivered to a customer. Note that, in FIG. 6, component related information 70 and delivery data 75 are memorized together, but delivery data 75 is not yet memorized at the point when component related information 70 is received. Also, in FIG. 6, items are shown conceptually for ease of understanding. Component related information 70 is data sent from a customer when newly performing mounting processing of a component that cannot be picked up with gripping members possessed by the customer (also referred to as a component with a specific shape, or a specific component). The supplier designs a gripping member (also referred to as a gripping member with a custom shape, or a custom gripping member) appropriate for the specific component using component related information 70.

Included in component related information is requested component information 71 that is information related to the specific component, storage member information 72 that is information of a storage member (component related member) such as tray 46 that stores the specific component, and the like. Included in requested component information 71 is component size information including overall size of the component and the size of specific portions of the component, component shape information indicating the overall shape of the component and the shape of specific portions of the component, and the like. Requested component information 71 may be CAD data. Using requested component information 71 it is possible to specify the shape, size, and so on of the specific component on the supplier side. Included in storage member information 72 is storage member size information that includes the overall size of the storage member and the like, and storage member shape information that includes information of the shape of the storage section in which the specific component is stored. Storage member information 72 may be CAD data. Because the shape of the member in which the specific component is stored can be grasped from storage member information 72, the supplier side is able to design a gripping member that is able to reliably grip the specific component without interfering with the storage member.

Included in delivery data 75 is gripping member design data 76 that is design data of the gripping member, gripping member management data 77 that includes information of the gripping member managed by management PC 35 of mounting system 30, gripping member identification information plate image data 78, and the like. Included in gripping member design data 76 is identification information (ID) that identifies the gripping member, base section size information that includes the size of the base section, base section shape information, claw section position and quantity information, claw section size information, claw section shape information, and the like. Gripping member design data 76 may be CAD data. Using gripping member design data 76, it is possible to specify the shape and size of the gripping member on the customer side. Included in gripping member management data 77 is identification information (ID) that identifies the gripping member, gripping member size information, interference prevention information used during mounting processing of mounting device 41, and the like. Interference prevention information, for example, is information of the space occupied by the gripping member including the movable range when attached to mounting head 44. Mounting device 41, by using interference prevention information, prevents the gripping member from interfering (contacting) with another member (for example, already arranged components, or storage members outside specifications) while mounting processing is performed with the gripping member attached. Gripping member identification information plate image data 78 is an image indicating identification information of the gripping member, and is an image formed on the surface of gripping member identification information plate 60. If a customer prints this image onto a stainless steel plate, the customer is able to obtain a gripping member identification information plate 60 corresponding to a newly designed gripping member.

Figure 7:
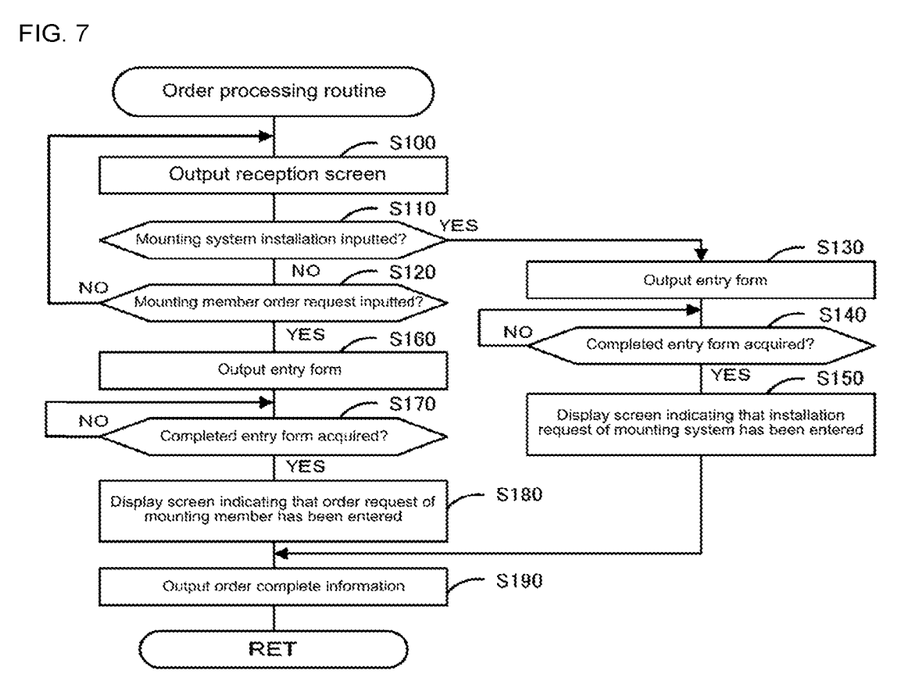
FIG. 7 is a flowchart showing an example of an order processing routine.

Next, operation of ordering and sales system 10 of the present embodiment is described, first, operation of receiving an order from a customer. Here, described mainly is the exchange of information between order processing device 20 and customer PC 33. For example, a requester on the customer side, when newly performing mounting processing of a specific component that cannot be picked up with the gripping members possessed by the customer, accesses order processing device 20 from customer PC 33, and issues a delivery request for a mounting member. FIG. 7 is a flowchart showing an example of an order processing routine performed by CPU 22 of order processing device 20. This routine is memorized on memory device 25 and is performed repeatedly upon a start instruction from an operator on the supplier side. When the routine is started, CPU 22 of control section 21 outputs reception screen to customer PC 33 (step S100).

Figure 8:
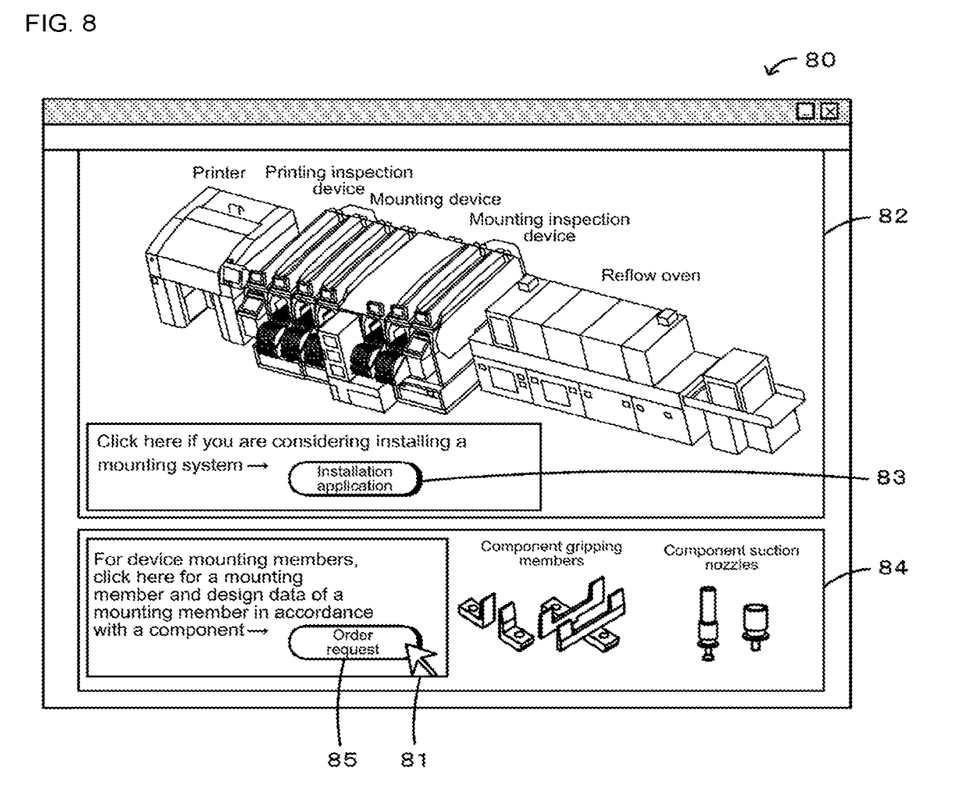
FIG. 8 shows an example of reception screen 80.

FIG. 8 illustrates an example of reception screen 80 displayed on the display of customer PC 33. Arranged on reception screen 80 are mounting system information providing field 82 for performing ordering of a mounting system and corresponding installation application button 83, and mounting member information providing field 84 for performing ordering of a mounting member and corresponding delivery request button 85. Displayed in mounting system information providing field 82 is information indicating the device itself to be delivered as a mounting related processing device. Displayed in mounting member information providing field 84 is information indicating design data to be delivered for a mounting member to be attached to the mounting related processing device. The requester operates customer PC 33, for example, by pressing installation application button 83 or order request button 85 of reception screen 80 displayed on the display of customer PC 33 using cursor 81.

Next, CPU 22 determines whether entry of installation of a mounting system has been inputted based on whether installation application button 83 was pressed (step S110). In a case in which installation of a mounting system was not entered, CPU 22 determines whether an order request of a mounting member was inputted based on whether order request button 85 was pressed (step S120). In a case in which an order request of a mounting member was not entered, processing is repeated from step S100. On the other hand, if an installation request of a mounting system was entered in step S110, CPU 22 outputs an entry form related to delivery of a mounting system to customer PC 33 (step S130). This entry form may include, for example, a materials request field, an entry field for the contact details of the customer, and so on. The requester enters the required information in the entry form and presses the send button. Next, CPU 22 determines whether data entered in the entry form has been acquired (step S140), and stands by if the data entered in the entry form has not been acquired. On the other hand, if data entered in the entry form has been acquired, CPU 22 outputs a reception screen on display 26 that includes information indicating that an installation request of a mounting system has been entered (step S150), outputs order complete information to customer PC 33 (step S190), and then ends the routine. An operator on the supplier side who checks the reception screen, contacts the requester of the customer and performs delivery and so on of the mounting related processing device.

On the other hand, if an order for a mounting member was entered in step S120, CPU 22 outputs an entry form related to delivery of a mounting member to customer PC 33 (step S160). This entry form may include, for example, an entry field for the contact details of the customer, a field for entering whether delivery by design data is desired, a field for attaching requested component information 71, a field for attaching storage member information 72, and the like. Here, if there is design data of the mounting member, there are cases in which the customer can manufacture the mounting member themselves, so this option can be selected. Continuing, CPU 22 determines whether data entered in the entry form has been acquired (step S170), and stands by if the data entered in the entry form has not been acquired. On the other hand, if data entered in the entry form has been acquired, CPU 22 outputs a reception screen on display 26 that includes information indicating that an order request of a mounting member has been entered (step S180). In this case, also displayed on the screen is information about whether delivery by design data is desired, attached information of requested component information 71 and storage member information 72, and so on.

Then, CPU 22 outputs order complete information to customer PC 33 (step S190), and then ends the routine. An operator on the supplier side who checks the reception screen, checks requested component information 71 and storage member information 72, and determines whether handling of the component is possible with a standard gripping member, whether a gripping member with a custom shape is to be delivered as design data, whether a gripping member with a custom shape is to be manufactured and then delivered, and so on. That determination result is then sent to the requester based on the contact details of the requester. For example, when the result determined based on the acquired requested component information 71 is that the component can be handled with the standard mounting member, information for delivery of this standard mounting member may be output to customer PC 33 of the requester via network 11. Also, when the component is a component with a custom shape that cannot be handled with the standard mounting member, delivery data 75 including design data of a mounting member with a custom shape designed based on the acquired component related information 70 may be output to customer PC 33 of the requester via the network. Note that, the operator delivers design data when it has been entered that delivery of design data is desired. Then, the operator starts design work of the mounting member using design PC 13.

Figure 9:
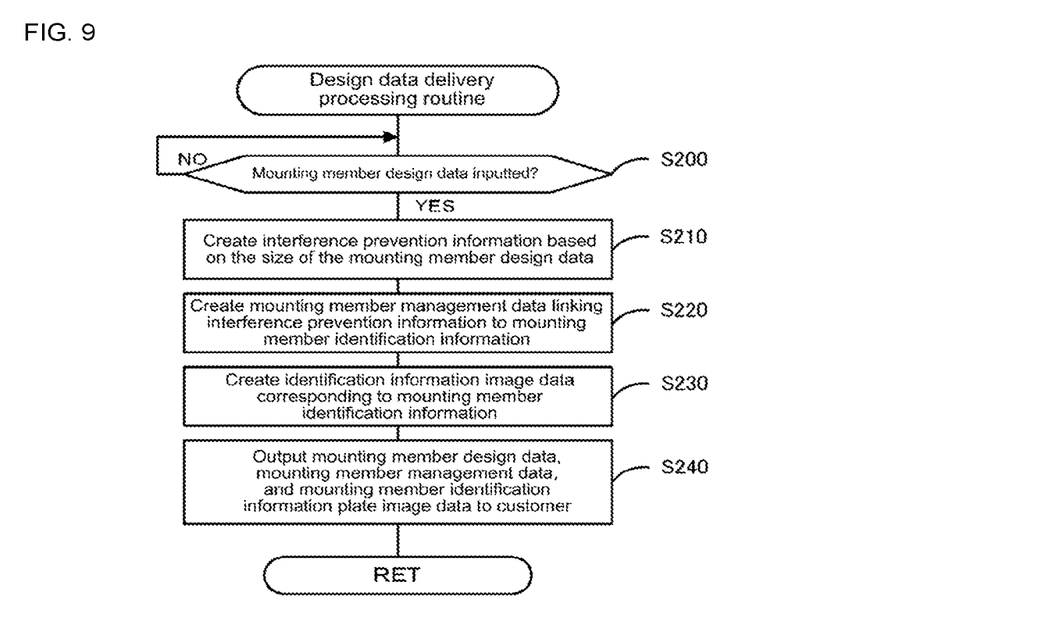
FIG. 9 is a flowchart showing an example of a design data delivery processing routine.

Continuing, delivery processing of design data of the mounting member is described. Here, a specific example of a case in which design data of gripping member 54B is delivered is described (refer to FIGS. 3 and 6). FIG. 9 is an example of a design data delivery processing routine performed by CPU 22 of control section 21. This routine is memorized on memory device 25 and is performed upon a start instruction from an operator on the supplier side. When the routine is started, CPU 22 of control section 21 determines whether design data of the mounting member has been entered (step S200). If design data has not been entered, CPU 22 stands by, and when design data is entered, CPU 22 creates interference prevention information based on the size of the mounting member in the design data (step S210). Here, an operator enters gripping member design data 76 (memorized on memory device 25), and CPU 22 creates interference prevention information of gripping member management data 77. Further, included in gripping member design data 76 is identification information of the mounting member (gripping member ID) assigned by the operator or the design development system of design PC 13.

Next, CPU 22 links the interference prevention information to the identification information of the mounting member and creates mounting tool management data including size information of the mounting member (step S220). Here, CPU 22 creates gripping member management data 77. Continuing, CPU 22 creates identification information image data corresponding to the mounting member identification information (step S230). Here, CPU 22 creates gripping member identification information plate image data 78. Then, CPU 22 outputs delivery data including mounting member design data, management data, and identification information plate image data to customer PC 33 (step S240), and then ends the routine. Here, CPU 22 outputs delivery data 75 to customer PC 33. Note that, processing of the above steps S210 to S230 can be performed using processing performed in normal manufacturing processes of mounting device 41.

The operator on the customer side who acquires delivery data 75 creates the newly designed mounting member (gripping member 54B) with 3D printer 34 using the newly designed mounting member design data (gripping member design data 76). Also, the operator performs registration of management data (gripping member management data 77) in a management database of management PC 35. Because work of registering gripping member management data 77 is all that is required, the requester is able to perform data management for the new gripping member 54B on management PC 35 with a small amount of work. Also, the management data (interference prevention data) can be used by mounting device 41. Further, an identification information plate (gripping member identification information plate 60) is created by printing the identification information plate image on the stainless steel plate. Continuing, the requester prepares mechanical chuck 50B by attaching the manufactured gripping member 54B to sliders 53, and attaches gripping member identification information plate 60 to plate attaching section 58. And, the requester causes mounting device 41 to perform mounting processing including the specific component. Control device 40 of mounting device 41, before mechanical chuck 50B is attached to mounting head 44, reads gripping member identification information plate 60 using mark camera 49. Control device 40 acquires interference prevention information for the gripping member corresponding to the read identification information from gripping member management data 77 and performs mounting processing using this information.

Figure 10:
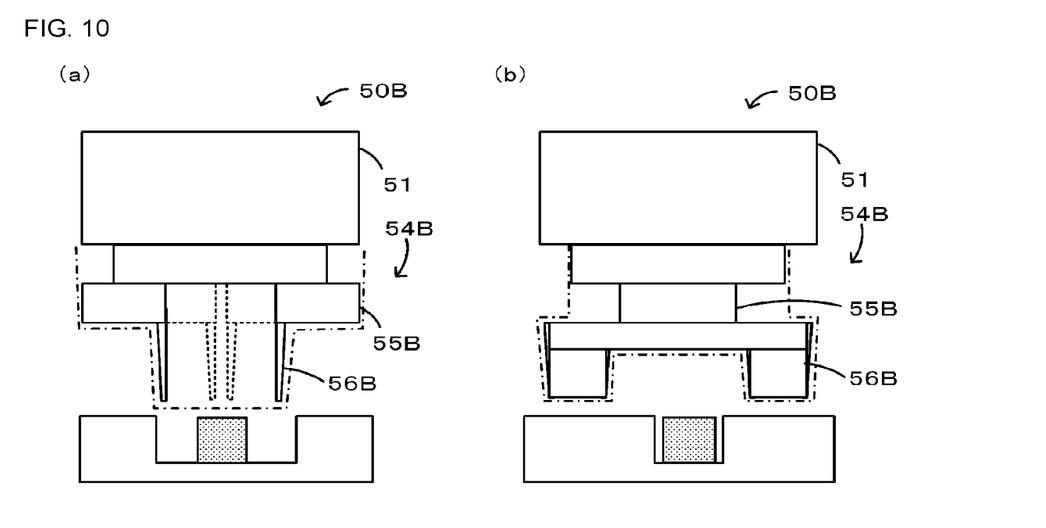
FIG. 10 illustrates prevention of member interference using interference prevention information.

FIG. 10 illustrates the prevention of interference of members during mounting processing using the interference prevention information, FIG. 10(*a*) being a side view and FIG. 10(*b*) being a front view. Because information regarding the space occupied by gripping member 54B (refer to the single-dot-and-dashes lines in FIG. 10) is included in the interference prevention information, control device 40 is able to recognize the physical range in which the tips of fixing section 51 exist. For example, if gripping member 54B is lowered while being moved in the XY directions, gripping member 54B moves diagonally downwards, and in this case control device 40 is able to grasp in advance whether gripping member 54B will contact an already mounted component P, or whether gripping member 54B will contact a stepped level of board S. Then, control device 40 is able to perform processing such that gripping member 54B is lowered following a path that avoids contact, or to stop lowering of gripping member 54B if there is a danger or contact. Such processing can be performed normally with a mounting member provided directly by a supplier, but is difficult to apply for an item manufactured originally by a customer. With ordering and sales system 10, it is possible to apply the same processing as that for a mounting member provided by a supplier, even for mounting members provided in the form of design data.

Correspondences between constituent elements of the present embodiment and constituent elements of the disclosure will be clarified here. Control section 21 and communication section 28 of the present embodiment correspond to the information acquiring section and information outputting section of the present disclosure, gripping members 54 and 54B correspond to the gripping member, and gripping member identification information plate 60 corresponds to the identification information plate. Note that, with the present embodiment, an example of the present disclosure of an order processing method is clear from the description of operation of order processing device 20.

With order processing device 20 described above, an order request of a mounting member (for example, gripping member 54) that is attached to a mounting related processing device (for example, mounting device 41), and component related information 70 that includes requested component information 71 related to a component with a specific shape to be handled by the mounting member and information (storage member information 72) of a component related member related to the component, are acquired either together or individually. Next, order processing device 20 outputs design data (gripping member design data 76) of a mounting member designed based on the acquired component related information 70 to customer PC 33 of the requester. That is, designing of the mounting member is performed on the side of the supplier of the component related processing device and the design data is delivered to the requester, and the mounting member is manufactured on the requester side based on the design data using technology possessed by the requester. In particular, there are cases where it is more convenient to manufacture a mounting member that is a consumable part at the requester side in a case in which there is the required processing technology at the requester side. In this manner, with order processing device 20 it is possible to provide a mounting member related to mounting processing with a more suitable division of labor.

Also, with order processing device 20, an order request of a pickup member appropriate for picking up a specific component from among mounting members, and component related information 70 including information related to this pickup member is acquired, and design data of the pickup member appropriate for picking up the component with the specific shape is outputted. With this device, it is possible to provide this component pickup member with a more appropriate division of labor. Further, because order processing device 20 acquires component related information 70 including shape information of a component with a specific shape and shape information of a storage member in which the component with the specific shape is stored, it is possible to provide a pickup member suitable for the component shape and a pickup member that avoids interference between members when removing the component from the storage member. Also, ordering processing device outputs information for delivery of a mounting related processing device itself to customer PC 33 of a requester via network 11, and outputs information for delivery of design data of a mounting member to be attached to the mounting related processing device to customer PC 33 of the requester via network 11. With this device it is possible to provide a mounting related processing device itself, and it is possible to provide design data of a mounting member to be attached to the mounting related processing device.

Also, order processing device 20 outputs information for delivery of a standard mounting member to customer PC 33 of the requester via a network when handling of the component is possible using the standard mounting member, and outputs information for delivery of design data of the mounting member with a custom shape designed based on the acquired component related information 70 to customer PC 33 of the requester via a network when the component with the specific shape cannot be handled by the standard mounting member. With this device it is possible to provide the mounting member itself in the case of a standard mounting member, and it is possible to provide design data in the case of a custom mounting member. Further, mounting device 41, which is a mounting related processing device, memorizes member management information related to mounting members to be attached and performs mounting processing using the member management information. At this time, order processing device 20 may also output member management information (gripping member management data 77) related to the mounting member of the design data to customer PC 33 of the requester. With this device, it is possible to manage mounting members on the same basis regardless of who manufactured the mounting member. Also, with this device, it is possible to easily manage new mounting members using the member management information.

Also, order processing device 20 outputs image data of identification information of characters or symbols affixed to the member to which the designed mounting member is to be fixed (fixing section 51) to customer PC 33 of the requester. With this device, for example, it is possible to affix image data of identification information to a manufactured mounting member or the like. Therefore, it is possible to identify mounting members on the same basis regardless of who manufactured the mounting member. Also, with this device, it is possible to more easily identify a new mounting member using the image data of the identification information. Further, mounting device 41 performs processing of identifying the mounting member by reading the identification information affixed to the member to which the mounting member is to be fixed (fixing section 51). With this device, because it is possible to check whether the mounting member currently attached is appropriate for the upcoming processing to be performed, it is possible to perform mounting processing more reliably. Also, with gripping member identification information plate 60, for example, it is possible to affix identification information plate to mechanical chuck 50. Therefore, it is possible to identify mounting members on the same basis regardless of who manufactured the mounting member. Also, it is possible to easily identify a new mounting member using the identification information plate. Further, because it is possible to check whether the mounting member currently attached is appropriate for the upcoming processing to be performed using the identification information plate, it is possible to perform mounting processing more reliably.

Meanwhile, it goes without saying that the disclosure is not limited to the above-mentioned embodiment and various embodiments may be applied within the technical scope of the disclosure.

Figure 11:
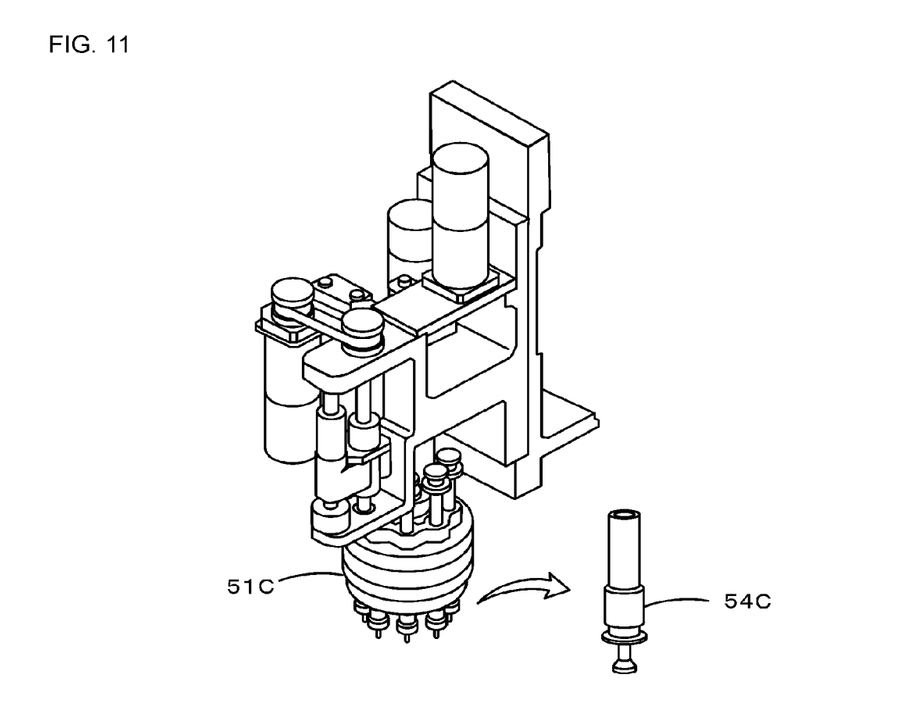
FIG. 11 shows nozzle holding section 51C and suction nozzle 54C.

For example, in the above embodiment, mounting member provided to a customer as design data is for gripping member 54 (mechanical chuck 50) that is a pickup member, but the disclosure is not limited to this, and may be, as shown in FIG. 11, suction nozzle 54C that is a pickup member that picks up a component using suction. FIG. 11 shows nozzle holding section 51C and suction nozzle 54C. In the above embodiment, although descriptions were omitted, nozzles holding section 51C to which suction nozzle 54 is attached can be connected to mounting head 44. Order processing device 20 may provide design data of suction nozzle 54C as a mounting member to a customer.

In the above embodiment, a mounting member provided to the customer as design data was a pickup member, but is not limited to this so long the member is for handling a component. For example, as shown in FIG. 5, the mounting member may be adapter 64 to which a storage member that stores the component. Order processing device 20 may provide design data of adapter 64 as a mounting member to a customer. Here, storage member information 72 may be included in component related information 70.

In the above embodiment, component related information 70 was described as including requested component information 71 that is information related to the specific component, and storage member information 72 related to a component related member (tray 46) that stores the specific component or on which the specific component is loaded, but either requested component information 71 or storage member information 72 may be omitted.

In the above embodiment, control device 21 outputs information for delivery of a mounting related processing device itself to a requester, and outputs information for delivery of design data of a mounting member to a requester, but the disclosure is not limited to this. For example, control section 21 may omit outputting information for delivery of the device itself. Also, control section 21 outputs information for delivery of a standard mounting member when handling of the component is possible with a standard mounting member to a requester, and outputs information for delivery of design data of a mounting member with a custom shape when the component cannot be handled by the standard mounting member, but the disclosure is not limited to this. For example, control section 21 may omit outputting information for delivery of the standard mounting member.

With the above embodiment, an operator determines whether a component acquired from a requester is able to be handled using the standard mounting member, but control section 21 may perform this determination. For example, control section 21 may grasp the shape and so on of a storage section or the shape of a specific component from requested component information or storage member information, and when using any of the gripping members prepared in the mounting system, may perform checking whether gripping of the specific component is possible, and checking whether interference (contact) will occur with the storage member for all gripping members. Further, control section 21 may determine that handling is possible with the standard mounting member in a case in which gripping the specific component is possible and interference with the storage member will not occur, and may determine that handling is not possible with the standard mounting member when such conditions are not met. By doing this, it is possible to provide a mounting member mounting processing with a more suitable division of labor, while reducing the burden on an operator. Note that, control section 21 may determine whether handling is possible with the standard mounting member in a similar manner for mounting members (pickup nozzle 54C and adapter 64)other than a gripping member.

With the above embodiment, included in delivery data for delivery to the requester is design data, member management data, and identification information plate image data, but so long as at least design data is included, the member management data and the identification information plate image data may be omitted. In this case also, it is possible to provide a mounting member related to mounting processing with a more suitable division of labor.

In the above embodiment, gripping member identification information plate 60 was described as an item attached to fixing section 51 to which gripping member 54 is attached, but the disclosure is not particularly limited to this, and the plate may be attached to another member, for example, gripping member 54. Alternatively, the identification information plate itself may be omitted.

In the above embodiment, gripping member 54 is formed on 3D printer 34 based on gripping member design data 76, but the method of forming the mounting member into a solid is not limited to 3D printer 34. The mounting member may be formed into a solid body by any method.

In the above embodiment, order processing device 20 of the present embodiment was described, but the disclosure is not limited to this, and an order processing method or a program thereof may be an embodiment.

INDUSTRIAL APPLICABILITY

The present disclosure may be applied to the industrial field of electronic component mounting.

REFERENCE SIGNS LIST

10: ordering and sales system; 11: network; 12: LAN; 13: design PC; 20: order processing device; 21: control section; 22: CPU; 23: ROM; 24: RAM; 25: memory device; 26: display; 27: input device; 28: communication section; 30: mounting system; 32: LAN; 33: customer PC; 34: 3D printer; 35: management PC; 40: control device; 41: mounting device; 42: board conveyance unit; 43: mounting unit; 44: mounting head; 45: component supply unit; 46: tray; 47: storage section; 49: mark camera; 50, 50B: mechanical chuck; 51: fixing section; 51C: nozzle holding section; 52: gripper holding section; 53: slider; 54, 54B: gripping member; 54C: suction nozzle; 55, 55B: base section; 56: claw section; 58: plate attaching section; 59: magnet; 60: gripping member identification information plate; 61: fixing section identification information display section; 62: tray feeder; 63: tray shuttle; 64: adapter; 70: component related information; 71: requested component information; 72: storage member information; 75: delivery data; 76: gripping member design data; 77: gripping member management data; 78: gripping member identification information plate image data; 80: reception screen; 81: cursor; 82: mounting system information providing field; 83: installation application button; 84: mounting member information providing field; 85: delivery request button; P: component; S: board

The invention claimed is:

1. An order processing device that handles information relating to a mounting related processing device that performs processing related to mounting of mounting components on a board, the ordering processing device comprising:
a processor including a ROM and RAM configured to:
acquire, either together or individually, via a network from an information processing device of a requester, an order request of a mounting member that is related to handling of a component with a specific shape and that is attached to the mounting related processing device, and component related information that includes at least one of information related to the component with the specific shape and information related to a component related member on which the component with the specific shape is stored or loaded, the mounting member being a gripping member configured to grip the component, the gripping member including a base section and a claw section that grips the component, the base section being fixed to a slider provided in a groove of a gripper holder section, the gripper holder section being fixed to a first surface of a fixing section of a mechanical chuck of the mounting related processing device, and a gripping member identification information plate being provided on a second surface of the fixing section; and
output to the information processing device of the requester, via the network, design data of the mounting member designed based on the acquired component related information, and mounting member management data that includes information of the mounting member managed by the information processing device of the requester;
a memory device;
a display;
an input device; and
a communication section,
wherein the mounting member management data includes interference prevention information, the interference prevention information including information of a space occupied by the gripping member when attached to the fixing section of the mechanical chuck, and
wherein the processor is further configured to
create the interference prevention information memorized by the memory device and delivered via the communication section by the processor based on a size of the gripping member, the interference prevention information including a physical range in which tips of the fixing section of the mechanical chuck exist,
link the interference prevention information to identification information of the gripping member based on the gripping member identification information plate and create the mounting tool management data including size information of the gripping member, and
create identification information plate image data memorized by the memory device and delivered via the communication section by the processor corresponding to the identification information of the gripping member and output the identification information plate image data to the information processing device of the requester.

2. The order processing device according to claim 1, wherein
the processor is further configured to
acquire the order request of a pickup member appropriate for picking up the component with the specific shape that is attached to the mounting related processing device, and the component related information that includes information related to the pickup member, and output the design data of the pickup member appropriate for picking up the component with the specific shape.

3. The order processing device according to claim 2, wherein
the processor is further configured to acquire the component related information including shape information of the component with the specific shape, and shape information of a storage member in which the component with the specific shape is stored.

4. The order processing device according to claim 1, wherein
the processor is further configured to, with respect to the mounting related processing device, output information for delivery of the device itself to the information processing device of the requester via the network, and, with respect to the mounting member to be attached to the mounting related processing device, output information for delivery of the design data to the information processing device of the requester via the network.

5. The order processing device according to claim 1, wherein
the processor is further configured to
output information for delivery of a pre-existing mounting member to the information processing device of the requester via the network when the pre-existing mounting member is capable of handling of the component, and
output information for delivery of the design data of the mounting member with the specific shape designed based on the acquired component related information to the information processing device of the requester via the network when the component with the specific shape cannot be handled by the pre-existing mounting member.

6. The order processing device according to claim 1, wherein
the processor is further configured to
receive member management information related to mounting members to be attached to the mounting related processing device, and perform processing related to the mounting processing using the member management information, and
output the member management information related to the mounting member of the design data to the information processing device of the requester.

7. An order processing method performed by a computer for handling information relating to a mounting related processing device that performs processing related to mounting of mounting components on a board, the ordering processing method comprising:
acquiring, either together or individually, via a network from an information processing device of a requester, an order request of a mounting member that is related to handling of a component with a specific shape and that is attached to the mounting related processing device, and component related information that includes at least one of information related to the component with the specific shape and information related to a component related member on which the component with the specific shape is stored or loaded, the mounting member being a gripping member configured to grip the component, the gripping member including a base section and a claw section that grips the component, the base section being fixed to a slider provided in a groove of a gripper holder section, the gripper holder section being fixed to a first surface of a fixing section of a mechanical chuck of the mounting related processing device, and a gripping member identification information plate being provided on a second surface of the fixing section; and
outputting to the information processing device of the requester, via the network, design data of the mounting member designed based on the acquired component related information, and mounting member management data that includes information of the mounting member managed by the information processing device of the requester,
wherein the mounting member management data includes interference prevention information, the interference prevention information including information of a space occupied by the gripping member when attached to the fixing section of the mechanical chuck, and
wherein the method further comprises
creating the interference prevention information based on a size of the gripping member, the interference prevention information including a physical range in which tips of the fixing section of the mechanical chuck exist;
linking the interference prevention information to identification information of the gripping member based on the gripping member identification information plate and creating the mounting tool management data including size information of the gripping member; and
creating identification information plate image data corresponding to the identification information of the gripping member and output the identification information plate image data to the information processing device of the requester.

* * * * *